United States Patent [19]

Langella et al.

[11] 3,764,907
[45] Oct. 9, 1973

[54] ELECTRONIC DIRECT-CURRENT WATTHOUR METER

[76] Inventors: Antonio Langella; Giorgio Savastano, both of Naples, Italy

[22] Filed: Sept. 18, 1972

[21] Appl. No.: 289,607

[52] U.S. Cl. ............................................ 324/141
[51] Int. Cl. ............................................ G01r 7/00
[58] Field of Search .............. 324/140, 141, 142

[56] References Cited
UNITED STATES PATENTS
3,655,955  4/1972  Brendle.................. 324/142 UX Primary Examiner—Alfred E. Smith
Attorney—Hugh A. Chapin et al.

[57] ABSTRACT

An electronic direct-current watthour meter for measuring the energy transmitted by a direct-current system is disclosed. The power transmitted by the system at a given instant is equal to the product of the voltage and current of the system. The watthour meter includes a voltage-frequency converter which is connectable to the voltage of the system for producing pulses having a frequency proportional to the system voltage. An associated pulse generator has a forward path circuit connectable to the system for receiving a quantity proportional to the current conducted by the system. The pulse generator provides an output in dependence upon this quantity and has a feedback circuit that includes a pulse former responsive to this output. The pulse former is connected so that it also receives the pulses of the voltage-frequency converter. With these inputs, the pulse former generates charging pulses having a charge value proportional to the period of the pulses generated by the converter whereby the charge value is inversely proportional to the voltage on the system and the charging pulses have a frequency proportional to the power transmitted by the system. A counter can be arranged to add the charging pulses and so count the energy transmitted by the system.

19 Claims, 3 Drawing Figures

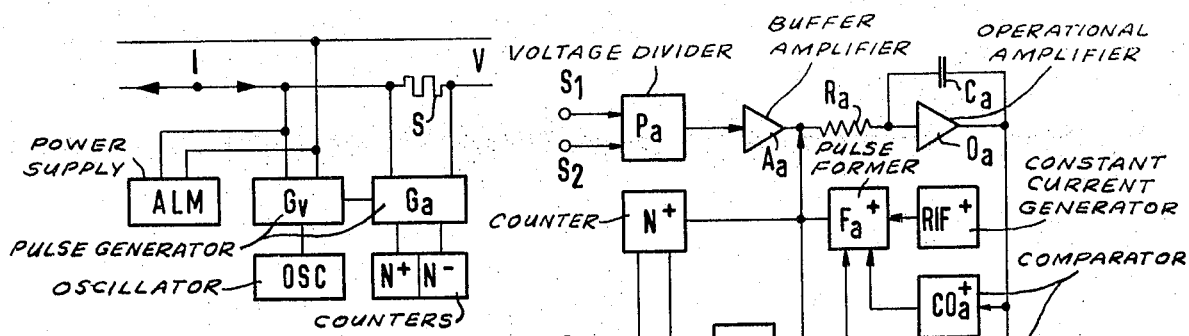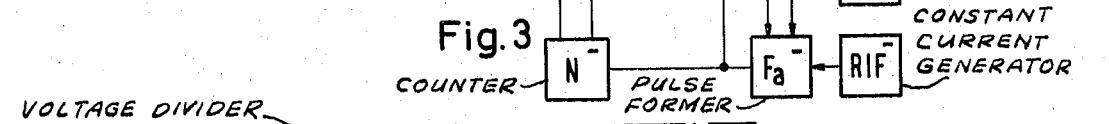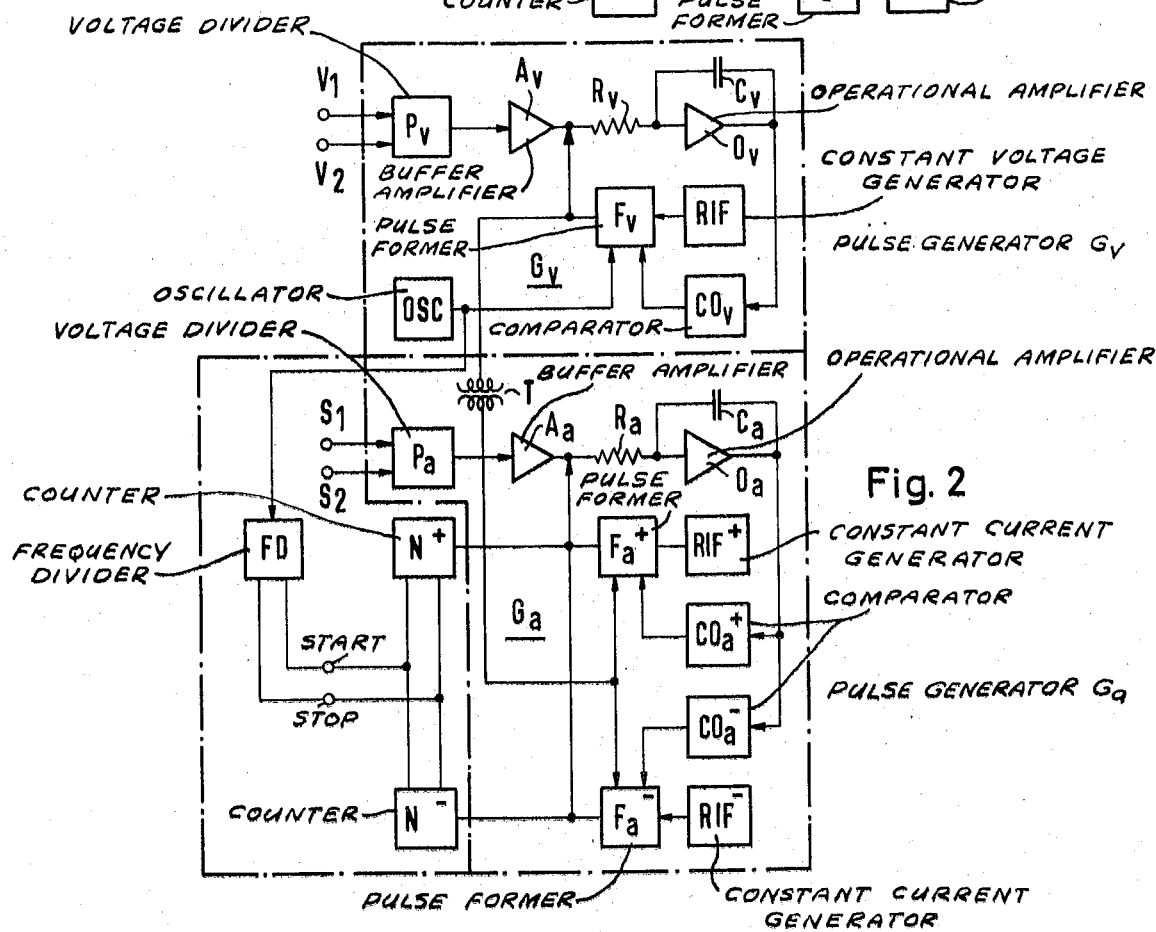

ELECTRONIC DIRECT-CURRENT WATTHOUR METER

BACKGROUND OF THE INVENTION

The invention relates to an electronic direct-current watthour meter.

In direct-current systems, the electric energy is usually measured by means of dynamometric meters or by arrangements consisting of saturated chokes and induction meters. In this connection, reference may be made to the Italian journal *L'Energia Elettrica*, 33, pages 607 to 620, (1956). In addition, arrangements are known which consist exclusively of static components, for example as described in the German journal *Messgerate fuer Betriebsmessungen*, C.G.S., 2nd Edition, pages 96 to 101 (1970). In this known equipment, it is not possible to keep measuring errors within very small error limits such as ±0.1 percent over the large range of load variations such as between 10 percent of rated current and 120 percent of rated current which are usual in such arrangements, this being especially the case in view of changes in the direction of the system current.

SUMMARY OF THE INVENTION

It is an object of the invention to provide an electronic direct-current watthour meter which maintains a small error tolerance over a wide range of load variation. Subsidiary to this object, it is an object of the invention to provide such a watthour meter which maintains an error tolerance of 0.1 percent over the entire range of load changes while at the same time taking the direction of the system current into consideration The electronic direct-current watthour meter of the invention measures the energy transmitted by a direct-current system. The power transmitted by the system is equal to the product of the voltage and current of the system. According to a feature of the invention, the watthour meter includes voltage-frequency converter means which is connectable to the voltage of the system for producing pulses having a frequency proportional to the voltage. An associated pulse generator is provided and includes associated forward path means connectable to the system for receiving a quantity proportional to the current conducted by the system and for providing an output in dependence upon this quantity. The generator is further equipped with associated feedback pulse generation means responsive to the last-mentioned output and is connected so as to receive the pulses of the converter means for generating compensating charging pulses having a charge value proportional to the period of the pulses generated by the converter means whereby the charge value is inversely proportional to the voltage on the system and the compensating charging pulses have a frequency proportional to the power transmitted by the system.

The voltage-frequency converter means includes a voltage-pulse generator which operates preferably according to a so-called amount-of-charge compensation method wherein the compensating charge pulses are generated by a constant current, the period of which can be controlled by an oscillator. For determining the two directions of energy flow, the pulse generator is associated with two compensation charge pulse formers responsive to inputs of opposite charge polarity and two counters for metering the energy for the two directions of energy flow.

According to another feature of the invention, the meter includes counters and the counting interval of the counters has a constant value and is preferably one second, the constant value of the counting interval being derived by reducing the frequency of the oscillator, for example, by means of a frequency divider. Space is saved by replacing two counters with a bidirectional counter.

According to another feature of the invention, a particularly simple voltage-pulse generator is obtained when the latter includes a voltage divider, a buffer amplifier, an operational amplifier with a capacitor and a resistor connected in a negative feedback circuit, a comparator, and a pulse former for generating compensation charging pulses of constant duration. The constant duration of the pulses is determined by a frequency oscillator. These pulses are also of constant amplitude which is determined by a constant-voltage generator.

The associated pulse generator can be configured in a simple manner if it is provided with an input circuit connected to the associated forward path means. The input circuit can include a voltage divider connectable across a voltage drop in a current conducting line of the system, and a buffer amplifier connected between the output of said voltage divider and the associated forward path means. The associated forward path means can in turn include an operational amplifier having a capacitor and a resistor connected so as to provide negative feedback for the operational amplifier. The associated feedback pulse generation means has two comparators connected to the output of the operational amplifier, one of the comparators delivering an output quantity when the output of the operational amplifier reaches a predetermined value of a first polarity in response to a flow of energy in one direction in the system and the other comparator delivering an output quantity when the output of the operational amplifier reaches a predetermined value of a second polarity in response to a flow of energy in the opposite direction in the system. Two pulse formers are connected to the comparators respectively for alternatively generating compensating charge pulses in dependence upon the direction of energy flow and two constant voltage generators are connected to respective ones of the pulse formers.

Circuit means in the form of a transformer can couple the voltage pulse generator to the associated pulse generator.

Although the invention is illustrated and described herein as an electronic direct-current watthour meter, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 is block diagram of the electronic direct-current watthour meter according to the invention.

FIG. 2 is block diagram showing how the voltage-frequency converter and the associated pulse generator are configured. This embodiment of the meter can be used to measure energy flow in a direct-current system in two directions.

FIG. 3 is a block diagram of a watthour meter operating without a voltage pulse generator, that is, the meter operates as an amperehour meter.

DESCRIPTION OF THE PREFERRED EMBODIMENTS OF THE INVENTION

The direct-current watthour meter shown in FIG. 1 includes a voltage-pulse generator $G_v$ and a current-pulse generator $G_a$ operating according to the charge compensation method, two counters $N^+$ and $N^-$ for both directions of energy flow and an oscillator OSC operating at a constant frequency in the order of 1 MHz. The voltage-pulse generator $G_v$ is connnectected to the system voltage and delivers rectangular pulses of constant duration and amplitude as well as a frequency proportional to the system voltage.

The pulse generator $G_a$ is connected on the input side with a precision resistor S through which the system current flows. The pulse generator $G_a$ is therefore controlled by the voltage drop across the resistor S. The pulses delivered by the pulse generator $G_a$ have constant amplitude, but because of the tie between the voltage pulse generator $G_v$ and the pulse generator $G_a$, the duration of the pulses of generator $G_a$ is inversely proportional to the frequency of the voltage pulse generator $G_v$ and the frequency of the pulses of generator $G_a$ is proportional to the electric power being measured.

The pulses coming from the pulse generator $G_a$ are added up by the two counters $N^+$ and $N^-$ during the interval between the two control signals designated in FIG. 2 by Start and Stop. In this way, the energy is determined which corresponds to the current flowing in each direction in the time interval between the two control signals. The frequency oscillator OSC determines the pulse duration in the voltage pulse generator $G_v$. For supplying the various circuit elements, a power supply unit ALM is provided, which can be operated from a direct-current system as well as from an alternating-current system.

Referring to FIG. 2, the voltage-frequency converter includes an oscillator OSC and a voltage pulse generator equipped with an input circuit; this generator also operates according to the charge compensation method. The voltage pulse generator also includes a forward path means in the form of an operational amplifier $O_v$. The direct-current input voltage is fed to an operational amplifier $O_v$ via the input circuit made up of a voltage divider $P_v$ and a buffer amplifier $A_v$. The operational amplifier has negative feedback consisting of a capacitor $C_v$ and a resistor $R_v$ and therefore functions as an integrator. The voltage pulse generator includes feedback pulse generation means comprising a comparator $CO_v$ and a pulse former $F_v$. When the output voltage of the integrator has reached a predetermined limit, the comparator stage $CO_v$ controls the pulse generator $F_v$ which functions as a compensation charge generator and delivers a rectangular pulse. The duration and amplitude of the pulse are constant and are determined by the oscillator OSC and the stage RIF, respectively. The stage RIF can be, for example, a constant voltage generator. The pulse is fed back to the operational amplifier $O_v$ and reduces the output voltage of the amplifier. This cycle is repeated over and over, the frequency of the compensation charge pulses being proportional to the input voltage. The compensation charge pulses are negative feedback pulses.

In the associated pulse generator $G_a$ according to FIG. 2, a voltage proportional to the system current is fed to an operational amplifier $O_a$ via an input circuit which includes a voltage divider $P_a$ and a buffer amplifier $A_a$. This operational amplifier, too, is provided with feedback by means of a capacitor $C_a$ and a resistor $R_a$ and therefore functions as an integrator. The integral increases or decreases, depending on the direction of the current. For a positive direction, the integral will reach the limit value of a comparator stage $CO_a^+$; for a negative direction, however, the limit value of a comparator stage $CO_a^-$ is reached. When the positive comparator stage $CO_a^+$ responds, the charge generator in the form of a pulse former $F_a^+$ transmits a pulse, wherein the pulse amplitude is predetermined by the stage $RIF^+$ and the pulse duration is equal to the period of the compensating charge pulses (negative feedback pulses) which are fed to the operational amplifier $O_v$ and to the transformer T. The pulse transmitted by the pulse former $F_a^+$ is in addition fed back to the input of the operational amplifier $O_a$ and reduces the output voltage of the operational amplifier. This cycle is repeated over and over, the pulse repetition frequency being directly proportional to the system current and inversely proportional to the pulse duration. From this a measure for the electric power is obtained, which is related to the current flowing in the positive direction. The number of pulses delivered by the current pulse generator $G_a$ and which number is directed to countor means comprising the counter $N^+$ in the time interval between the Start and the Stop control signals, is proportional to the power integral for current flowing in the positive direction, that is proportional to positive energy.

If the current flows in the opposite direction or more specifically, the negative direction, the cycle repeats in a similar manner, however, now the elements of the pulse generator $G_a$ designated by the minus sign respond. The counter means also includes counter $N^-$ which gives the integral of the power which corresponds to the current flowing in the negative direction, that is, the negative energy. The stages designated $RIF^+$ and $RIF^-$ can be, for example, respective constant current generators.

If the system voltage is constant, the measurement of the electric energy can be confined to a current measurement. In FIG. 3, a watthour meter according to the invention is shown which functions without a voltage pulse generator. Such a watthour meter then corresponds to an ampere-hour meter and consists only of a current-pulse generator, which corresponds to the pulse generator $G_a$ shown in FIG. 2. In lieu of the voltage-pulse generator, an oscillator OSC is connected to this current-pulse generator. In this way, the duration of the compensating charge pulses is kept constant. Here too, the compensating charge pulses are negative feedback pulses.

If the time interval between the control pulse for starting the counting and the control pulse for ending the counting is chosen equal to one second, the mean values of the power and the current can be measured with the watthour meter according to the invention. The control signals can be obtained from the oscillator OSC by suitable frequency reduction means, for example, a frequency divider, FD.

In addition to the advantage of saving space, the bidirectional counter affords the further advantage that the power is indicated as the algebraic sum of the two counts of counter N+ and counter N−. A bidirectional measuring unit can therefore always be used if only the total value and not the individual values of the power corresponding to the two directions of current is desired.

What is claimed is:

1. An electronic direct-current watthour meter for measuring the energy transmitted by a direct-current system, the power transmitted by the systems at a given instant being equal to the product of the voltage and current of the system, said watthour meter comprising voltage-frequency converter means connectable to the voltage of the system for generating pulses having a frequency proportional to said voltage; and an associated pulse generator comprising associated forward path means connectable to the system for receiving a quantity proportional to the current conducted by the system and for providing an output in dependence upon said quantity, and associated feedback pulse generation means responsive to said output and connected so as to receive said pulses of said converter means for generating compensating charging pulses having a charge value proportional to the period of said pulses generated by said converter means whereby said charge value is inversely proportional to the voltage on the system and said compensating charging pulses have a frequency proportional to the power of the system.

2. The watthour meter of claim 1, said voltage-frequency converter means comprising a voltage pulse generator including forward path means connectable to the voltage of the system for providing an output voltage in dependence upon said voltage, and feedback pulse generating means responsive to said output voltage for generating compensating charging pulses and for feeding the same back to the input of said forward path means of said voltage generator.

3. The watthour meter of claim 2, said voltage-frequency converter means comprising an oscillator connected to said feedback pulse generating means of said voltage pulse generator for adjusting the duration of said pulses generated therein.

4. The watthour meter of claim 3, said feedback pulse generating means of said voltage pulse generator comprising pulse forming means for forming said pulses thereof from a constant current.

5. The watthour meter of claim 4, said pulses of said voltage-frequency converter being said compensating charge pulses generated in said feedback pulse generating means of said voltage pulse generator, said meter comprising circuit means for directing said last-mentioned pulses from said last-mentioned feedback pulse generating means to said associated feedback pulse generating means.

6. The watthour meter of claim 5 said circuit means comprising a transformer coupling said feedback pulse generating means of said voltage-pulse generator to said associated feedback pulse generating means.

7. The watthour meter of claim 3 comprising counter means connected to said associated feedback pulse generation means for adding the pulses generated therein between given points in time.

8. The watthour meter of claim 7 for a system wherein energy can flow in two directions, said associated feedback pulse generation means comprising two pulse formers electrically connected to the output of said associated forward path means for alternatively generating compensating charge pulses in dependence upon the direction of energy flow, the charge pulses corresponding to one direction of the two directions of flow having a polarity opposite to the charge pulse corresponding to the other direction of the two directions of flow, and said counter means comprising two counters electrically connected to said pulse formers respectively for counting the energy flowing in the respective directions.

9. The watthour meter of claim 8, said counter means comprising frequency reduction means connected to said oscillator for generating start and stop signals for initiating and ending the counting action of said counters thereby defining a counting time interval for counting the energy transmitted by the system, said time interval having a constant value.

10. The watthour meter of claim 9, said time interval being one second.

11. The watthour meter of claim 7 for a system wherein energy can flow in two directions, said associated feedback pulse generation means comprising two pulse formers electrically connected to the output of said associated forward path means for alternatively generating compensating charge pulses in dependence upon the direction of energy flow, the charge pulses corresponding to one direction of the two directions of flow having a polarity opposite to the charge pulses corresponding to the other direction of the two directions of flow, and said counter means comprising a bidirectional counter electrically connected to said pulse formers for counting the energy flowing in the respective directions.

12. The watthour meter of claim 4, said voltage pulse generator comprising an input circuit connected to said forward path means thereof, said input circuit including a voltage divider connectable across the voltage of the system, and a buffer amplifier connected between the output of said voltage divider and said forward path means; said forward path means of said voltage pulse generator comprising an operational amplifier having a capacitor and a resistor connected so as to provide negative feedback for said operational amplifier; said feedback pulse generation means of said voltage pulse generator comprising a comparator connected to the output of said operational amplifier, and said pulse forming means being a pulse former for generating said compensating charge pulses of said voltage pulse generator in response to inputs from said comparator, said last-mentioned pulses being of constant duration and constant amplitude, said oscillator being connected to said pulse former for establishing said constant duration, and a constant voltage generator also connected to said pulse former for establishing said constant amplitude.

13. The watthour meter of claim 12 for a system wherein energy can flow in two directions, said associated pulse generator comprising an associated input circuit connected to said associated forward path means, said associated input circuit comprising a voltage divider connectable across a voltage drop in a current conducting line of the system, and a buffer amplifier connected between the output of said last-mentioned voltage driver and said associated forward path means; said associated forward path means comprising an operational amplifier having a capacitor and a resistor connected so as to provide negative feedback for said operational amplifier; said associated feedback pulse generation means comprising two comparators connected to the output of said last-mentioned operational amplifier, one of said comparators delivering an output quantity when the output of said operational amplifier reaches a predetermined value of a first polarity in response to a flow of energy in one of the two directions and the other one of said comparators delivering an output quantity when the output of said operational amplifier reaches a predetermined value of a second polarity in respone to a flow of energy in the other one of the two directions, said polarities being mutually opposite, and two pulse formers connected to said comparators respectively for alternatively generating compensating charge pulses in dependence upon the direction of energy flow; and two constant voltage generators connected to respective ones of said pulse formers.

14. The watthour meter of claim 13 comprising two counters electrically connected to said pulse formers for counting the energy flowing in the respective directions.

15. The watthour meter of claim 14, said counter means comprising frequency reduction means connected to said oscillator for generating start and stop signals for initiating and ending the counting action of said counters thereby defining a counting time interval for counting the energy transmitted by the system, said time interval having a constant value.

16. The watthour meter of claim 15, said time interval being one second.

17. The watthour meter of claim 15 comprising a transformer for coupling the output of said feedback pulse generating means of said voltage-pulse generator to said two pulse formers of said associated feedback pulse generating means.

18. The watthour meter of claim 1 for a system wherein energy can flow in two directions, said associated pulse generator comprising an input circuit connected to said associated foward path means, said input circuit comprising a voltage divider connectable across a voltage drop in a current conducting line of the system, and a buffer amplifier connected between the output of said voltage divider and said associated forward path means; said associated forward path means comprising an operational amplifier having a capacitor and a resistor connected so as to provide negative feedback for said operational amplifier; said associated feedback pulse generation means comprising two comparators connected to the output of said operational amplifier, one of said comparators delivering an output quantity when the output of said operational amplifier reaches a predetermined value of a first polarity in response to a flow of energy in one of the two directions and the other one of said comparators delivering an output quantity when the output of said operational amplifier reaches a predetermined value of a second polarity in response to a flow of energy in the other one of the two directions, and two pulse formers connected to said comparators respectively for alternatively generating compensating charge pulses in dependence upon the direction of energy flow; and two constant voltage generators connected to respective ones of said pulse formers.

19. The watthour meter of claim 1 wherein it is required to measure the ampere-hours in the system, said voltage-frequency converter means being an oscillator for generating pulses, said feedback pulse generation means of said associated pulse generator being connected to receive said pulses of said oscillator for generating compensating charging pulses that are of constant duration and that have a frequency proportional to the current flowing in the system.

* * * * *